Nov. 13, 1962    H. SCHWARZLANDER    3,064,192

ELECTRIC METER

Filed March 10, 1959

INVENTOR.
HARRY SCHWARZLANDER
BY
Walter J. Kreske
ATTORNEY

United States Patent Office 3,064,19[?]
Patented Nov. 13, 196[?]

3,064,192
ELECTRIC METER
Harry Schwarzlander, Malden, Mass., assignor to General Electronic Laboratories, Inc., Cambridge, Mass., a corporation of Massachusetts
Filed Mar. 10, 1959, Ser. No. 798,515
5 Claims. (Cl. 324—118)

This invention relates to electric meters and more particularly to electric meters applicable to measurement of electric signals having irregular wave characteristics.

For known periodic electric waves such as sine waves, conventional meter circuits may be calibrated to give desired information such as peak or root-mean-square value of the sine waves being measured. However, for electric waves of non-repetitive nature or unknown shape and frequency, conventional meters fail to give meaningful results. The present invention is particularly applicable to these situations of electric waves of non-repetitive nature and waves having unknown shapes and frequencies. For example, it makes possible in such waves the finding of a value proportional to the root-mean-square voltage of the voltage-versus-time wave being measured.

Accordingly, a primary object of the present invention is the provision of an electric meter for measuring electric waves whether or not they are of a periodic nature and known shape.

Another object is the provision of an electric meter for providing the means for measurement of electric waves of varying shape and/or frequency.

A still further object is the provision of an electric meter for providing a voltage proportional to the mean-square value of the voltage in a voltage versus time wave.

And a further object is the provision of an electric meter particularly adaptable for the measurement of electric signals characteristic of human speech.

A still further object is the provision of an electric meter for electric signals of unknown shape and frequency which is reliable and accurate in its operation.

And another object is the provision of an electric meter for electric signals of unknown shape and frequency which is relatively inexpensive to manufacture.

These and other features, objects and advantages of the invention will become more apparent from the following description taken in connection with the accompanying drawings of a preferred embodiment of the invention, and wherein.

Figure 1:
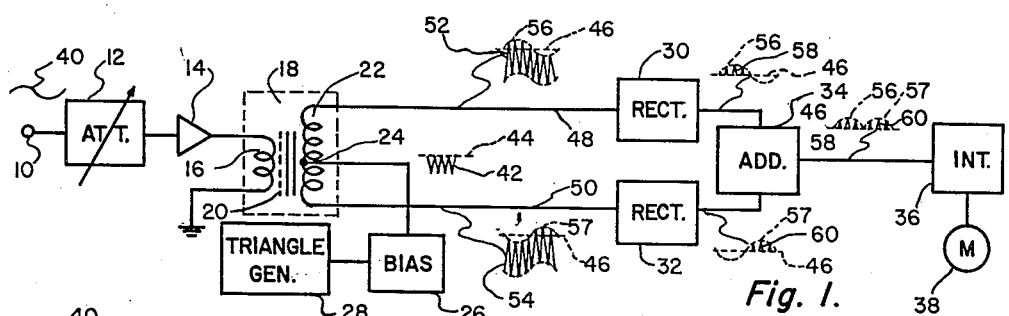
FIGURE 1 is a block diagram of the preferred embodiment of the invention.

Referring to the FIG. 1 embodiment in more detail, an input terminal 10 for connecting to any suitable signal source (not shown) for electric signals to be measured, is coupled through a variable attenuator 12, which may be of the resistor type, a suitable amplifier 14 and a primary 16 of a transformer 18 to ground. Inasmuch as the present embodiment is particularly adapted for audio electric signal frequencies at the terminal 10, an audio amplifier 14 and an audio transformer 18 are used. The audio transformer 18 is preferably of the type having a faraday shield 20 and a secondary 22 having a center tap 24 coupled through a voltage biasing circuit 26 to the output of a triangular voltage wave generator 28. The ends of the secondary 22 are connected through rectifiers 30 and 32 respectively to the inputs of an adder-circuit 34 whose output is coupled to an integrating circuit 36 which also has coupled thereto an electric voltmeter 38.

In the operation of the electric meter device in FIG. 1 an input signal 40, such as a voltage sine wave, at the terminal 10 will appear through the variable attenuator 12 and the audio amplifier 14 at the primary 16 of the transformer 18 with an intensity selectably set by the variable attenuator 12. Simultaneously a triangular voltage wave 42 from the triangle generator 28 and voltage biasing circuit 26 is set with a bias voltage so that it has a peak voltage 44 which is equal to the threshold voltage 46 of the rectifiers 30 and 32. Therefore, the output of the secondary 22 in lines 48 and 50 to the rectifiers 3[?] and 32 respectively may be represented by the voltage curves 52 and 54 respectively with the peaks following imaginary envelope 56 and and 57 similar to the input signal 40 but 180° out of phase with each other. Thus, during the positive half-cycle of the envelope 56 the output of rectifier 30 will carry the voltage spikes 58 above the threshold 46 and during the positive half-cycle of the envelope 57, the output of rectifier 32 will carry the voltage spikes 60 above the threshold 46. The output of the adder circuit 34 will therefore contain the voltage spikes 58 and 60 and feed them to the integrator circuit 36 when the voltage spikes 58 and 60 are integrated to produce an output signal which is proportional to the area under the triangular spikes 58 and 60. This integrated output signal is fed to the voltmeter 38 which is preferably calibrated to give a square root reading of the voltage output of the integrator circuit 36 to thereby give a reading proportional to the root-mean-square value of the input signal 40.

It will be noted that if there is no input signal 40 the triangular voltage waves 42 will not pass the rectifiers 30 and 32 since their peak values 44 are set at threshold 46 of the rectifiers 30 and 32. They will pass the rectifiers 30 and 32 only if they are added to a signal 4[?] as explained above. Thus, if there is no signal 40 at the input terminal 10 the reading on the meter 38 would be zero. The meter 38 will read other than zero only when a signal 40 is fed in at the terminal 10 and this reading on the meter 38 will be a root-mean-square indication of the strength or intensity of the input signal 40.

The mathematical basis for this device is that triangular waves 42 from the triangle generator 28 appear as isosceles triangles. The area under an isosceles triangle is a function of and is proportional to the square of the height of the triangle. By moving the height of the triangle up and down with respect to the reference or threshold value 4[?] the area of the triangles above the threshold 46 will a[?]ways vary as the square of the amplitude or height of these triangles. Integration of these triangles in the integrator circuit 36 produces a voltage proportional to the means square value of the various heights of the triangle above the threshold 46. This mean square value, together with the calibration of the voltmeter 38 to the square root of voltages fed to it, give a root-mean-square reading of the signal 40.

While in this instance a triangle voltage generator [?] was used to specifically provide for achieving root-mean square values at the voltmeter 38, outputs proportional to other mathematical functions may be similarly achieved by using a generator 28 with a suitable signal other than the triangle.

Figure 2:
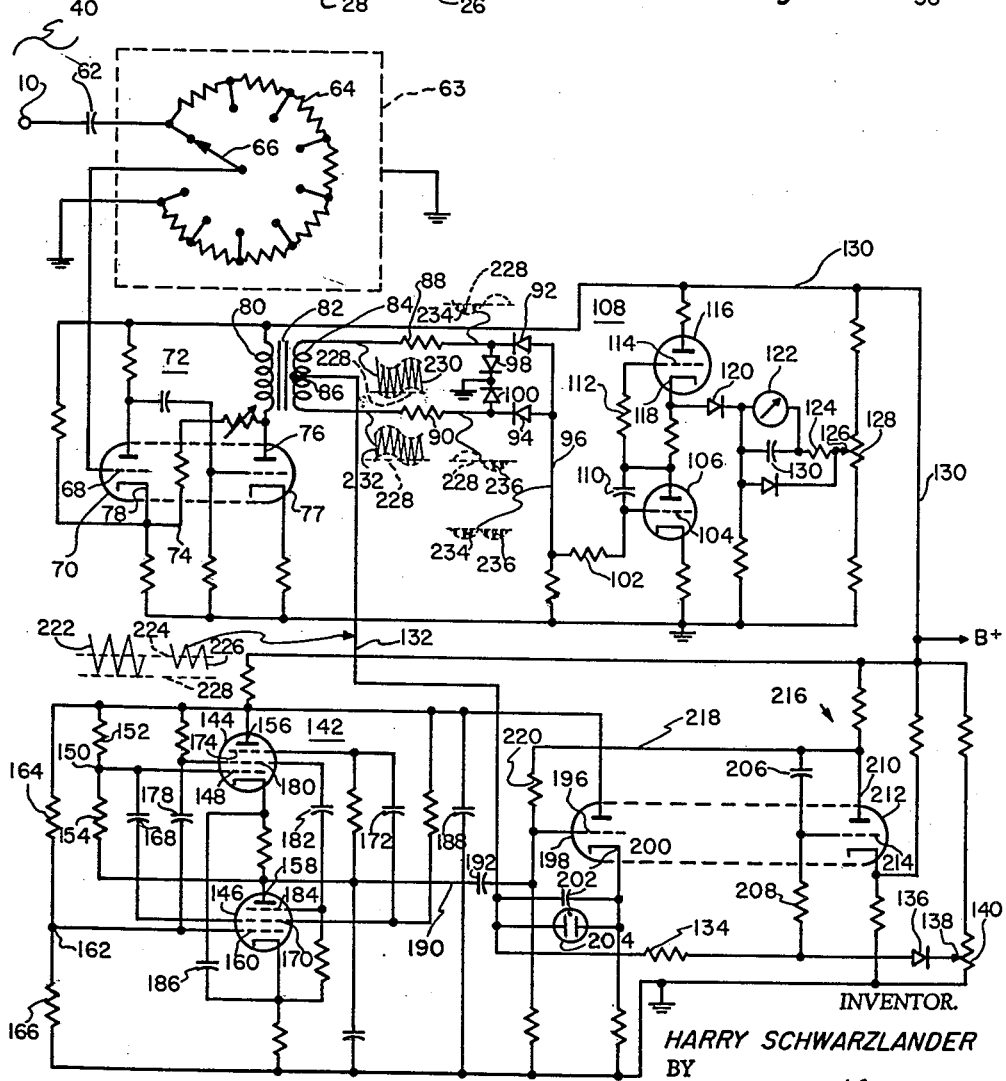
FIGURE 2 is a schematic diagram of representative circuits suitable for use in FIGURE 1.

Referring to FIG. 2 in more detail for circuits suitable for use in FIG. 1, the input terminal 10 may be coupled through a suitable coupling capacitor 62 to an attenuator 63 which may consist of series connected resistors [?] from selected points of which an input signal 40 may [?] obtained by a movable switching arm 66 and fed to control grid 68 in a first stage of a double triode 70 in [?] audio amplifier circuit 72. A feedback loop 74 from plate 76 of the second half 77 of double triode 70 is coupled back to cathode 78 to help in obtaining linearity [?] response of the amplifier circuit 72. The audio amplifier circuit 72 is of a type suitable for use as the amplifier circuit 14. Plate 76 of tube 77 drives a primary 80 of audio transformer 82 which may be similar to the transformer 18, and which has a secondary 84 with a center tap 86 and respective ends connected through resistors 88 and 90 and rectifiers 92 and 94 respectively to an output line 96. To improve rectification two additional rectifiers 98 and 100 are connected from the output sides of resistors 88 and 90 respectively to ground. The output line 96 is coupled through an integrator resistor 102 to a control grid 104 of a triode 106 in a series balanced meter amplifier circuit 108. The output line 96 is also coupled through the integrating resistor 102 and integrator capacitor 110 both to the plate of the triode 106 and through a resistor 112 to control grid 114 of a triode 116 in the series balanced amplifier circuit 108. Cathode 118 of triode 116 is connected through a rectifier 120 to a voltmeter 122 in accordance with the charge on the integrator capacitor 110. The voltmeter 122 is preferably calibrated to provide readings which are proportional to the square root of the voltages appearing across it.

The other side of the voltmeter 122 is connected through a resistor 124 and adjustable arm 126 to a voltage divider resistor 128 connected between a B+ power line 130 and ground. Adjustment of the arm 126 thereby permits an adjustment for zero position of the voltmeter 122. A damping capacitor 130 is provided across the voltmeter 122 to reduce the speed of response of voltmeter 122 in accordance with the type of signals 40 to be measured. It is particularly desirable in the measurement of speech signals to insure a suitably long time constant.

The center tap 86 on the secondary 84 is connected to a voltage bias line 132 which is coupled through a resistor 134, a rectifier 136 and adjustable arm 138 to a voltage divider resistor 140 connected between B+ and ground. Also coupled to the voltage biasing line 132 is a triangle voltage generator 142. The triangle voltage generator 142 has two pentodes 144 and 146 connected in series in such manner that when one is fully conducting the other is not fully conducting. To achieve this, control grid 148 of the pentode 144 is coupled to a terminal 150 between a pair of voltage divider resistors 152 and 154 connected between plate 156 of the pentode 144 and plate 158 of the pentode 146. A control grid 160 of pentode 146 is coupled to a terminal 162 between voltage divider resistors 164 and 166 connected between the plate 156 of the pentode 144 and ground. A capacitor 168 is connected between the control grid 148 of the pentode 144 and grid 170 of the pentode 146. Grid 170 is also connected through a capacitor 172 to a grid 174 in the pentode 144. Control grid 160 of the pentode 146 is connected through a capacitor 178 to grid 180 in the pentode 144. Grid 180 is also connected through a capacitor 182 to grid 184 in the pentode 146. A capacitor 186 is also coupled to the cathodes of the pentodes 144 and 146. The capacitors 168, 178, 172, 182 and 188 are adjusted in value to produce a stable triangular output signal from the triangle generator 142 through line 190 and coupling capacitor 192 at grid 196 of a cathode follower stage 198. This unique circuit arrangement in the triangle voltage generator 142 may be considered from one aspect as a combination of a series coupled multivibrator and grid coupled multivibrator having as its primary aim the achievement of simplicity and reliability in operation. This circuit reduces to only two the number of tubes needed to produce true triangular waves.

Cathode 200 of the cathode follower stage 198 is coupled through a capacitor 202 and a neon lamp 204 in parallel to the voltage bias line 132 and thereby to center tap 86 of the transformer secondary 84. An integrator capacitor 206 and integrator resistor 208 are connected in series between a plate 210 of a triode 212 and the rectifier 136 and coupled to a control grid 214 of the triode 212 in manner to form a Miller integrator circuit 216 having an output coupled through a line 218 and a resistor 220 to grid 196 of the cathode follower 198 for stabilizing the bias in the bias line 132 as will be hereinafter further described.

In the operation of the FIG. 2 embodiment, input signal such as sine wave 40 at the terminal 10 will appear through the coupling capacitor 62 and movable arm 66 at the control grid 68 of the audio amplifier circuit 72 so as to drive the primary 80 of the audio transformer 82. Simultaneously, a triangular voltage wave 222 generated in the triangle wave generator 142 appears through the coupling capacitor 192 at the grid 196 of the cathode follower 198 and thereby through a capacitor 202 in the voltage bias line 132. The triangular voltage wave 222 will also appear through the resistor 134 at the rectifier 136 which has a threshold voltage 224 preset by the movable arm 138 on the resistor 140 so that portions of the voltage triangles 222 above the threshold voltage 224 pass through the rectifier 136. The portions of the triangular wave 222 below the threshold voltage 224 are integrated in the capacitor 206 in the Miller integrator circuit 216 so as to apply a corrected feedback through line 218 at the grid 196 of the cathode follower 198 so as to prevent the triangular wave 222 from changing to a triangular wave such as 226 having peak voltages different from a threshold voltage 228 which is the threshold voltage of rectifiers 92 and 94 arranged to receive signals from the secondary 84 of the audio transformer 82.

Thus the triangular voltage wave 222 will be maintained in line 132 and will appear at the center tap 86 so as to cause, together with the signal voltage 40 from the primary 80, a triangular wave signal pattern 230 at resistor 88 and a triangular wave signal pattern 232, which is 180° out of phase with the pattern 230, at the resistor 90. Thus voltage peaks 234 appearing below the threshold voltage 238 will cause current to pass through the rectifier 92 while voltage peaks 236 below the threshold voltage 238 will pass through rectifier 94 so as to produce in line 96 peaks 234 and 236 which are integrated in the capacitor 110. The resulting voltage across capacitor 110 is suitably amplified in the series balanced meter circuit 108 and registered on the voltmeter 122 as the root-mean-square voltage of the signal 40.

This invention is not limited to the specific details of construction and operation disclosed, as equivalents will suggest themselves to those skilled in the art.

What is claimed is:

1. In combination, a triangular voltage wave generator having a triangular voltage wave output terminal, a transformer having a primary and secondary winding with the secondary having a center tap, voltage biasing means coupled to the triangular voltage wave output terminal and the center tap, the voltage biasing means including a cathode follower having a cathode coupled to the centertap and a control grid coupled to the generator of triangular waves, a feedback circuit coupled to the generator of triangular waves and the control grid, input signal means coupled to the primary, an integrating circuit, and full wave rectifier means coupling the secondary to the integrating circuit.

2. In combination, means for receiving an electric signal to be measured, a triangular voltage wave generator of the type having two pentodes and associated circuitry to form a series coupled multivibrator and grid coupled multivibrator with an output line carrying the triangular voltage wave signals, a transformer having a primary coupled to the receiving means and a secondary with a center tap, a cathode follower circuit having an input grid coupled to the output line of the triangular voltage wave generator and a cathode coupled to the center tap, a Miller integrator circuit coupled to the cathode follower grid and center tap for providing a substantially constant reference voltage level at the center tap, a voltmeter, an electric integrating circuit across said meter, and full wave rectifier means coupled across the secondary of the transformer and having an output coupled to the integrating circuit.

3. In combination, a first and second pentode, each having an anode, cathode and three grids including a control grid, a resistor coupled to the cathode of the first pentode and the anode of the second pentode, a cathode resistor coupled between the cathode of the second pentode and ground, a plate resistor coupled to the anode of the first pentode and adapted for coupling to the positive terminal of an electric potential source, voltage biasing means coupled to each of the control grids and resistive capacitive circuits coupled to respective grids of said pentodes and proportioned to effect a substantially triangular voltage versus time pattern at the anode of said second pentode means coupled to the anode of said second pentode for providing an oscillatory envelope configuration for said triangular voltage pattern and including voltage reference means such that the oscillatory envelope configuration is distributed into positive and negative half cycles with respect to the voltage reference, and means coupled to the last mentioned means for integrating the triangular voltage pattern in both half cycles.

4. In an electric meter circuit for measuring oscillatory electric signals of unknown shape and frequency, the combination of a transformer having a primary and a secondary with a centertap, means for applying said oscillatory electric signals across the primary, a generator of triangular electric waves, cathode follower means having a cathode and control grid, the cathode coupled to the centertap and the control grid coupled to the generator of triangular waves, a feedback circuit coupled to the generator of triangular waves and control grid, full wave rectifier means across said secondary, means coupled to the full wave rectifier means for integrating the electric output therefrom, and means coupled to said integrating means for indicating the value of said integrated output.

5. In an electric meter circuit for measuring oscillatory electric signals corresponding to voice sound waves in an audio frequency band, the combination of an audio transformer for operation in said frequency band and having a primary and secondary with a centertap, means coupled to the primary for applying said oscillatory electric signals to the primary, a generator for triangular electric waves having a frequency at least three times the frequency of the lowest frequency oscillatory signal to be measured, biasing means for accurately positioning the peaks of the triangular waves at a selected value coupled to the generator and centertap for applying the triangular electric waves to the secondary at the centertap, full wave rectifier means across said secondary, the rectifier means having a threshold characteristic at said selected voltage value, means coupled to the full wave rectifier means for averaging full wave rectified electric output therefrom, and means coupled to said averaging means for indicating the value of said averaged output.

References Cited in the file of this patent

UNITED STATES PATENTS

| | | |
|---|---|---|
| 1,987,539 | Razek | Jan. 8, 1935 |
| 2,662,213 | Vanderlyn | Dec. 8, 1953 |
| 2,826,694 | Ropiequet | Mar. 11, 1958 |
| 2,842,666 | Woodcock | July 8, 1958 |
| 2,842,740 | Sparks | July 8, 1958 |

OTHER REFERENCES

Publication, "Square-Law Circuit" by Lion and Davis of Mass. Inst. of Technology, Cambridge, Mass., at pages 192, 194, 196, 198, 200, and 202, of "Electronics" magazine, September 1955.